United States Patent Office 2,723,191
Patented Nov. 8, 1955

2,723,191

ORGANIC SULFUR COMPOUNDS AND HERBICIDES CONTAINING SAME

Arthur H. Schlesinger and David T. Mowry, Dayton, Ohio, assignors to Monsanto Chemical Company, St. Louis, Mo., a corporation of Delaware No Drawing. Application September 26, 1951,
Serial No. 248,465

6 Claims. (Cl. 71—2.5)

The present invention relates to heterocyclic organic compounds of sulfur and more particularly provides a series of the hitherto unknown acylthianaphthene-1,1-dioxides, methods of preparing the same, herbicidal compositions comprising the new compounds, and methods of destroying undesirable plants, in which methods the present herbicidal compositions are employed.

According to the invention there are provided 3-acylthianaphthene-1,1-dioxides having the formula

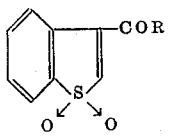

in which R is an alkyl radical of from 1 to 5 carbon atoms. Examples of compounds having the above formula are 3-acetylthianaphthene-1,1-dioxide, 3-propionylthianaphthene-1,1-dioxide, 3-isobutyrylthianaphthene-1,1-dioxide, 3-n-valeroylthianaphthene-1,1-dioxide, etc.

The 3-acylthianaphthene-1,1-dioxides are readily prepared by contacting the corresponding acylated thianaphthenes with hydrogen peroxide at ordinary or increased temperatures and in the presence or absence of an inert solvent or diluent. Advantageously reaction is effected in the presence of an unreactive solvent medium such as glacial acetic acid, dioxane, acetone, methyl ethyl ketone, etc., and temperatures of from, say, 50° C. to the refluxing temperature of the reaction mixture are used. The easy oxidation of the acylated thianaphthenes to the 1,1-dioxides by treatment with hydrogen peroxide is surprising, for in prior art the selenium dioxide oxidation of an acylated thianaphthene has been reported to occur at the acyl group with formation of 3-thianaphtheneglyoxal. (J. Organic Chemistry, 10 381–5 (1945)).

The present 3-acylthianaphthene-1,1-dioxides are well defined stable compounds which may be advantageously employed for a variety of industrial and agricultural purposes. They are particularly valuable as herbicides, but some of this series of compounds also may be advantageously employed as insecticides and pesticides in general, as intermediates in manufacture of pharmaceuticals, etc.

The invention is further illustrated, but not limited, by the following examples.

Example 1

A mixture consisting of 5.0 g. of 3-acetylthianaphthene, 18.4 ml. of 30% hydrogen peroxide and 20 ml. of glacial acetic acid was brought to a temperature of 105° C. and held at this temperature for 45 minutes, during which time the solution became homogenous and yellow. The whole was allowed to cool, and then poured into 500 ml. of water. After allowing the resulting mixture to stand for one hour, the precipitate which formed was filtered off and washed with water and suction-dried to give a yellow powder, M. P. 139–43° C. This was recrystallized from dilute ethanol and heat-dried to yield 3.2 g. (56% theoretical yield) of pale yellow plates of the substantially pure 3-acetylthianaphthene-1,1-dioxide, M. P. 148.0–149.0° C., and analyzing as follows:

|  | Found | Calcd. for $C_{10}H_8O_3S$ |
|---|---|---|
| Percent C | 57.6 | 57.83 |
| Percent H | 3.85 | 3.93 |

Example 2

Spray testing of the herbicidal activity of the above 3-acetylthianaphthene-1,1-dioxide was conducted as follows:

A 1% aqueous suspension of the thianaphthene compound was prepared, employing 0.2% of an emulsifying agent known to the trade as "Emulsifier L" and comprising a mixture of a polyethylene glycol derivative and an alkylbenzenesulfonate. Three week-old corn and bean plants were used for the test, two plants of each variety being sprayed with the aqueous suspension. The spraying was continued until droplets formed on and/or fell from the foliage and stems of the sprayed plants, up to 15 ml. of the aqueous suspension being applied to each plant. The sprayed plants as well as two untreated "blank" specimens of each plant were then allowed to remain in the same greenhouse for a period of one week. At the end of that time the sprayed plants were compared with the untreated plants in order to determine the extent of injury, if any. The corn plants were found to be severely injured by the spray, whereas the bean plants showed only moderate injury.

The present 3-acylthianaphthene-1,1-dioxides are generally incorporated into inert carriers when employed as herbicidal compositions, since they are active in only very small concentrations. They are preferably applied by spraying aqueous suspensions or oil emulsions of the same, this method affording an easy and inexpensive way of destroying plant growth. Dispersing or emulsifying agents are advantageously employed in the preparation of the herbicidal suspensions or emulsions. However, the 3-acetylthianaphthene-1,1-dioxides are likewise effective when applied in agricultural dusts; or they may be used with water-insoluble insecticides, fungicides, etc., in customarily employed organic solutions. Solid carriers which may be used include, e. g., clay, talc, pumice, bentonite, etc.

What we claim is:
1. Compounds having the formula

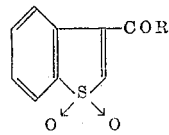

in which R is an alkyl radical of from 1 to 5 carbon atoms.

2. 3-acetylthianaphthene-1,1-dioxide.

3. The process which comprises contacting with hydrogen peroxide a 3-acylthianaphthene having the formula

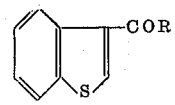

in which R is an alkyl radical of from 1 to 6 carbon atoms, and recovering from the resulting reaction product a compound having the formula

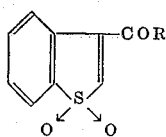

in which R is an alkyl radical of from 1 to 5 carbon atoms.

4. The process which comprises heating 3-acetylthianaphthene with hydrogen peroxide while dissolved in glacial acetic acid and recovering 3-acetylthianaphthene-1,1-dioxide from the resulting reaction product.

5. A herbicidal composition comprising an inert carrier, and as the essential active ingredient an acylthianaphthene-1,1-dioxide having the formula

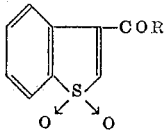

in which R is an alkyl radical of from 1 to 5 carbon atoms.

6. A herbicidal composition comprising an inert carrier and 3-acetylthianaphthene-1,1-dioxide as the essential active ingredient.

References Cited in the file of this patent

UNITED STATES PATENTS

| | | |
|---|---|---|
| 2,287,102 | Basel | June 23, 1942 |
| 2,478,914 | Greensfelder et al. | Aug. 16, 1949 |
| 2,556,664 | Smith | June 12, 1951 |
| 2,557,673 | McKellin et al. | June 19, 1951 |